(12) United States Patent
Cheong et al.

(10) Patent No.: US 9,161,040 B2
(45) Date of Patent: Oct. 13, 2015

(54) ADAPTIVE BLOCK PARTITIONING WITH SHARED BIT-BUDGET

(71) Applicant: SONY CORPORATION, Tokyo (JP)

(72) Inventors: Hye-Yeon Cheong, Milpitas, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/265,709

(22) Filed: Apr. 30, 2014

(65) Prior Publication Data

US 2015/0201191 A1 Jul. 16, 2015

Related U.S. Application Data

(60) Provisional application No. 61/925,883, filed on Jan. 10, 2014.

(51) Int. Cl.
| | |
|---|---|
| *G06K 9/00* | (2006.01) |
| *H04N 19/103* | (2014.01) |
| *H04N 19/176* | (2014.01) |
| *H04N 19/98* | (2014.01) |
| *H04N 19/13* | (2014.01) |
| *H04N 19/124* | (2014.01) |

(52) U.S. Cl.
CPC ........... *H04N 19/103* (2014.11); *H04N 19/124* (2014.11); *H04N 19/13* (2014.11); *H04N 19/176* (2014.11); *H04N 19/98* (2014.11)

(58) Field of Classification Search
CPC ... H04N 19/90; H04N 19/124; H04N 19/176; H04N 19/109; H04N 19/11; H04N 19/147; H04N 19/159; H04N 19/182; H04N 19/61; H04N 19/12; H04N 19/146; G06K 9/38
See application file for complete search history.

(56) References Cited

U.S. PATENT DOCUMENTS

| | | | |
|---|---|---|---|
| 2002/0181771 A1 | 12/2002 | Li et al. | |
| 2008/0089595 A1* | 4/2008 | Park | 382/233 |
| 2008/0226183 A1* | 9/2008 | Lei et al. | 382/238 |
| 2010/0046628 A1 | 2/2010 | Bhaskaran et al. | |
| 2010/0322597 A1 | 12/2010 | Gharavi-Alkhansari et al. | |
| 2011/0292247 A1* | 12/2011 | Gharavi-Alkhansari et al. | 348/231.99 |
| 2012/0288210 A1 | 11/2012 | Chen et al. | |

* cited by examiner

*Primary Examiner* — Ali Bayat
(74) *Attorney, Agent, or Firm* — John P. O'Banion

(57) ABSTRACT

In the inventive embedded block coding (EBC) image coding system, sub-block partitioning is selected based on the image content. For example, decisions based on image content can include spatial considerations, such as differences between the right and left portions of the block, texture differences or color component differences. The inventive method then shares the available bit budget between these partitioned sub-blocks.

20 Claims, 4 Drawing Sheets

ADAPTIVE BLOCK PARTITIONING WITH SHARED BIT-BUDGET

CROSS-REFERENCE TO RELATED APPLICATIONS

This application claims the benefit of U.S. provisional patent application Ser. No. 61/925,883 filed on Jan. 10, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Technology

This disclosure pertains generally to block partitioning within a video encoder, and more particularly to adaptive partitioning based on image characteristics, and in which the sub-blocks share a bit-budget.

2. Background Discussion

Methods of embedded block coding (EBC) are known, in which image compression provides random access capability, with the image partitioned into small blocks which are each coded independently of other blocks in the image. EBC is particularly well-suited for use with intra-coded digital images. The encoder generates a fixed and predetermined number of bits for each block. During decoding, each image block is also able to be decoded independently of any other image block.

In general, the image is partitioned into one or more blocks, which are encoded using a plurality of quantization factor values, after which a best mode of encoding is determined to generate compressed data, which includes selecting either a particular quantization level of differential pulse code modulation (DPCM), or using pulse code modulation (PCM).

However, these forms of EBC coding do not optimize the image for the given bit budget.

Accordingly, a need exists for an EBC coding system which overcomes the shortcomings of these prior techniques without undue overhead. The present invention fulfills that need and overcomes the shortcomings of prior techniques.

BRIEF SUMMARY OF THE INVENTION

The present invention is an enhancement of embedded block coding (EBC), wherein blocks are selectively partitioned into sub-blocks for which separate mode decisions are made, and which share a bit budget for the block. The type of partitioning is performed on a block based on image content, such as texture considerations. Utilizing the inventive adaptive block partitioning and bit budget sharing, video coding efficiency is improved, as can be determined by both peak signal-to-noise ratio (PSNR) and subjective quality.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosure will be more fully understood by reference to the following drawings which are for illustrative purposes only:

DETAILED DESCRIPTION

1. Introduction

Figure 1:
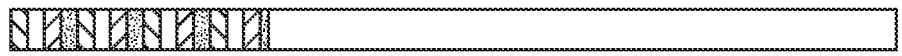
FIG. 1 is a diagram of a pixel block, showing pixels on the left having different image characteristics than the pixels on the right.

Generally, EBC coding requires use of fixed image block sizes. In this present technology, however, these blocks are selectively partitioned and a shared bit budget utilized for the partitioned off sub-blocks.

Mode decisions are made (determined) during EBC on whatever style of input block is received. The mode decision is made in response to trial encoding of a given block at various DPCM quantization levels, which is compared to a PCM mode. The mode decision computes bit-coverage, or sum of absolute differences (SAD), or sum of squared differences (SSD), or other desired bit coding efficiency metric upon which to select a best mode. Accordingly, the mode decision determines if a block is to be coded using DPCM or PCM. If DPCM, it determines which qn value.

In PCM mode coding, consider the example of a block with an 8 bit-depth (bits per sample) and it is desired to compress to 4-bps (bits per sample), which represents a 50% compression. If the block is coded with PCM mode, then the 4 MSBs of every sample are encoded and sent in the bitstream. The decoder reconstructs the 4 MSBs from the bitstream and the rest of 4 LSBs are preferably estimated, such as utilizing a middle point reconstruction described herein. For example, if a sample value has binary places "abcdefgh" then the "abcd" portion of 4 MSBs are sent, while the portion of places "degh"

is thrown away at the encoder. The decoder receives the "abcd" portion to reconstruct "abcd1000", using middle point reconstruction. It should be appreciated, however, that there are many alternative ways to reconstruct the 4 LSBs.

In DPCM mode coding, consider the case where the mode decision determines that qn=3 provides the best performance, such as determined by largest bit-coverage or smallest SAD, or other metric, whereby the encoder quantizes 3 LSBs from the whole block. After quantization, then prediction is performed. A first sample is PCM coded and the rest are DPCM coded. Residuals of the remaining samples are entropy coded. The mode decision always ensures that the total number of bits, including all entropy coded bits+PCM coded bits of first sample+header, will never exceed the bit-budget.

However, after entropy coding all residuals, there is typically some remaining bit-budget. The present technology utilizes these "left-over" bits to code those bit-planes that are quantized, with these bits being referred to as "refinement bits". In the qn=3 example, bit-planes 4, 5, 6, 7 and 8 are all losslessly coded using the DPCM method, with the refinement bits coding bit-plane 3 as much as the bit-budget allows.

It should be noted that the image block being coded may be of various component color configurations, such as RGB, YUV, or it could even be a block of just one color, say R or G or B, or for example a Luma block or Chroma block. Considering the case of coding a YUV block, it could be conventionally coded three different ways: (1) feeding the whole YUV block to EBC with the mode decision selecting one mode for the entire YUV block; (2) feeding the Y block to EBC with the UV block separately coded by EBC, whereby the chosen mode for Y can differ from the chosen mode for U and V; or (3) Y, U, V blocks are all separately encoded by EBC. At times option 1 is most efficient when the YUV components all have similar texture. At other times option 2 is most efficient when Y has high texture and Chroma (UV) is flat but option 2 has header cost. So block by block, sometimes option 1 codes more efficiently and sometimes option 2 codes more efficiently.

In the present technology, blocks are partitioned into sub-blocks which share the block bit budget. For example, consider a whole YUV block directed to EBC for coding, and the inventive EBC adaptively selects to separate it into sub-blocks and code it as all joint or Y separately from UV or even left-half YUV block separately from right-half YUV block, during an enhanced mode decision operation.

Another important point of this method is that in response to mode decision selection, one component such as Y, can be separately coded from UV (Y mode is different from UV mode). In particular, Y could be PCM coded while UV DPCM coded. The present invention shares the bit-budget between these two sub-blocks (Y sub-block and UV sub-block), whereby the Y sub-block may use significantly more bits than the UV sub-block or vice versa. Part of the mode decision is selecting the mode of each sub-block, such that the coding quality (i.e., bit-coverage, SAD, SSD, and so forth) of two nearby sub-blocks is similar. In contrast, the conventional method of option 2, described above (Y coded separately from UV), uses a fixed bit-budget for Y and a fixed bit-budget for UV. The present technology, however, allows two sub-blocks to use any arbitrary bit-budget as long as the total bit-budget is fixed. Typically Y (Luma) has higher texture and UV has a more flat texture. The inventive method allows the UV sub-block to loan (provide) bits to Y sub-block to improve the quality because blocks with higher texture require more bits for coding.

2. Block Partitioning

The present technology performs adaptive partitioning of blocks into sub-blocks based on different considerations of the image. Each of the sub-blocks can then be coded in a different manner (DPCM or PCM), utilize different quantization values and so forth.

2.1. Partitioning Based on Spatial Considerations.

If the block size is large or long (e.g., 16×1, 32×1, 64×1, 32×2, 64×2, and so forth), then it will be recognized that the image content and/or texture of one side of that block may significantly differ from that of the other side.

FIG. 1 depicts an example 1D block (e.g., 16×1) having image content seen in the left which significantly differs from that on the right. It will be noted that the right side is shown without pixel division, toward more easily indicating image differences with the pixels on the left, despite both sides comprising a series of pixels. It should be appreciated that EBC is particularly well-suited for 1D image blocks, because utilizing 2D blocks requires line memory, with the need to store entire pixel row(s) of an image. However, the present technology can be utilized with 2D blocks in response to extending a vertical partition. In either case the present technology beneficially partitions these blocks into smaller sub-blocks, for example spatial partitioning can be as simple as splitting the block left-half and right-half sub-blocks.

Figure 2:
FIG. 2 is a diagram of the pixel block of FIG. 1, shown after sub-block partitioning according to an embodiment of the present disclosure.

FIG. 2 illustrates an example result of the inventive partitioning of the block seen in FIG. 1, based on spatial considerations. Partitioning may also be performed in more complex forms on the basis of spatial differences without departing from the teachings of the present technology.

2.2. Partitioning Between Color Components.

Sub-block partitioning can also be performed on the basis of color components, which proves useful when one color component tends to have different textures from the other color components. For example, in the YUV color space, Y (Luma) is usually very different (e.g., spatially) from UV (Chroma). It will be noted that the actual pixel value is not important when coding, yet the spatial variation between pixels plays a prominent role in determining best mode (e.g., PCM/DPCM/qn). By way of example and not limitation, the present technology can partition the color space by splitting one color component from the others, for example, YUV, Y can be split from the UV components. The same concepts can be applied to other color spaces, for example RGB, raw data, and so forth.

3. Bit-Budget Sharing

The present technology does not independently allocate refinement bits for each of these sub-blocks. The mode for each sub-block is determined by the mode decision, and whatever total left-over bits (refinement bits) from both sub-blocks are combined and first allocated to sub-block with least optimum coding (high qn or PCM mode). If both sub-blocks are coded with the same quality (same qn or same PCM), then refinement bits are allocated evenly to both sub-blocks. This ensures that the decoded quality of two sub-blocks is similar. According to the technology, sub-blocks with lower bit-coverage (before refinement) are allocated more refinement bits than sub-blocks having higher levels of bit-coverage. It should be appreciated that the term "bit-coverage" generally refers to the number of bits coded losslessly counting from the MSB to LSB direction. Consider the example of an 8 bit-depth 16×1 Luma block coded using DPCM with qn=3, which has a bit-coverage before refinement=(8−3)*16*1=80 because 5 MSB bit-planes are losslessly coded. Accordingly, this technology allocates different bit-budgets to different sub-blocks, whereby difficult (high textured) sub-blocks receive an increased bit-budget over low textured sub-blocks. The inventive goal in the bit-budget sharing is that of minimizing the maximum error.

4. Example Embodiments

Figure 3:
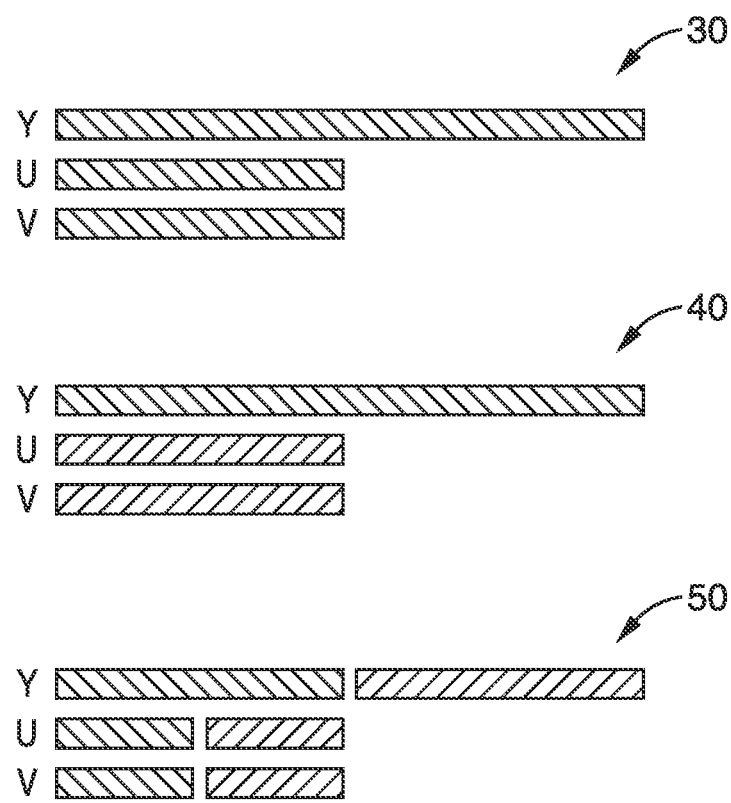
FIG. 3 shows three diagrams of partitioning performed according to an embodiment of the present invention for joint, color partition, and spatial partition, respectively.

FIG. 3 illustrates example embodiments 30, 40 and 50 of simple block partitioning, the example being shown for a YUV 422 block. Embodiment 30 depicts an all joint embodiment, wherein a single sub-block is utilized. Embodiment 40 illustrates a color partition, with Y separated from the U and V color components. Embodiment 50 illustrates a spatial partition, with left and right portions separated into separate sub-blocks.

Figure 4:
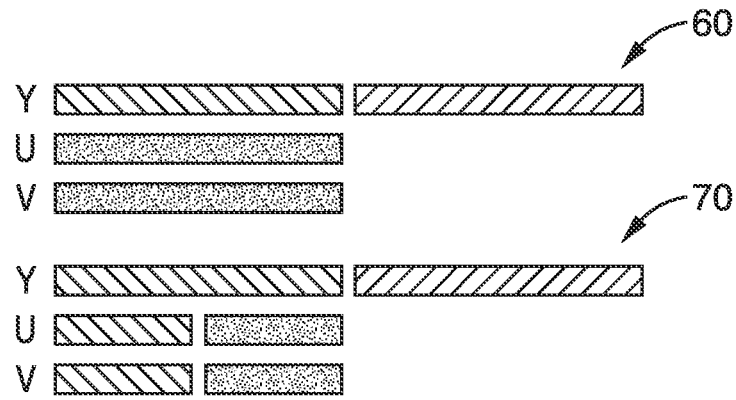
FIG. 4 shows two diagrams of additional forms of partitioning performed according to an embodiment of the present disclosure.

FIG. 4 illustrates different variations of partitioning that can be performed according to the present technology. Although, in at least one preferred embodiment, only the partitioning shown in FIG. 3 is utilized. However, other partitions can be utilized in embodiments of the present technology. Partition embodiment 60 is shown having three sub-blocks comprising a Y-left sub-block, a Y-right sub-block, and a UV sub-block. Partition embodiment 70 is shown having three sub-blocks comprising a left YUV sub-block, a Y-right sub-block, and a UV-right sub-block. It should be appreciated that unduly increasing the number of possible partitions, can increase header cost with little to no attendant benefits. Also, it should be noted that with more than two partitioned sub-blocks, mode decisions become significantly more complicated.

Referring back to FIG. 1, a 16×1 example block (e.g., YUV 422 block) is depicted having distinct differences between the right and left sides. Consider the case where the present technology selects left-right block partitioning for coding, with the left block selected for coding in PCM mode, and the right block selected for DPCM mode, for instance with quantization qn=0. A 16×1 YUV 422 block has a 16×1 Y block, an 8×1 U block, and an 8×1 V block. Since UV is always considered jointly, 16×1 YUV 422 block consists of 16×1 Y block, and a 16×1 UV block.

Figure 5:
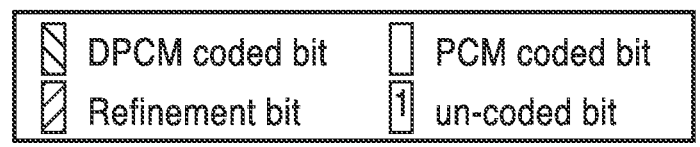
FIG. 5 is a diagram of block encoding using a combination of PCM and DPCM according to an embodiment of the present disclosure, showing the availability of refinement bits and un-coded bits.
Figure 5:
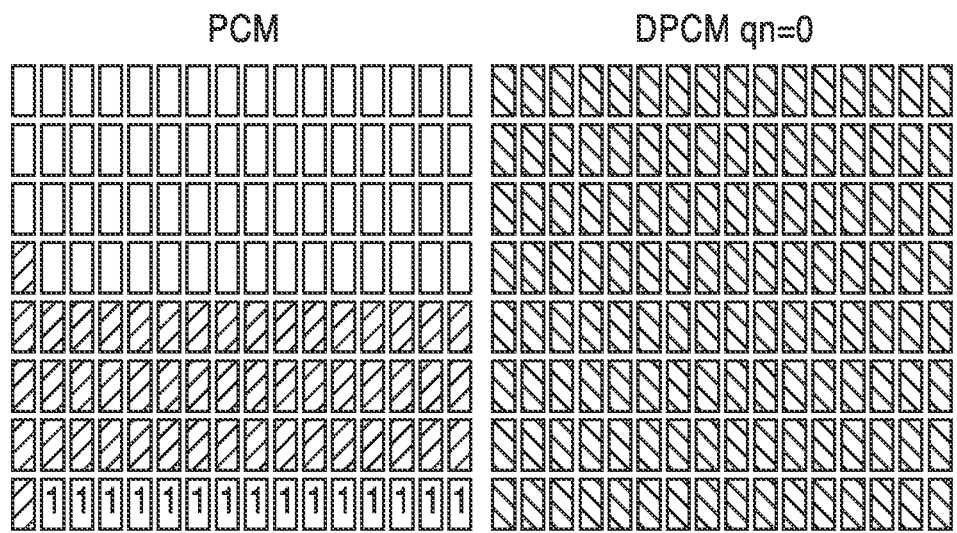

FIG. 5 illustrates different sub-block coding determined during the inventive mode decision, with the 16×1 Y block being PCM coded, and the 16×1 UV part being DPCM qn=0 coded. The bits in the top bit-plane (row) are the most-significant bits (MSBs), moving down to the bottom bit-plane which has the least-significant bits (LSBs). In the figure, bits in the left and right portions are shown as being either: (a) PCM coded bit, (b) refinement bit, (c) DPCM coded bit, or (d) un-coded bit. It should be noted that there are a number of ways to reconstruct un-coded bits. For example, loading with 0's, or loading with 1's as represented in the figure, depending on the codec designer. It will be recognized that the missing bits (un-coded bits) could be any value from 00 . . . 00 to 11 . . . 11. In one preferred embodiment of the inventive EBC, a middle reconstruction is performed, where a value is picked as a middle value 10 . . . 00. In this figure example, only 1 LSB is un-coded, so it is simply reconstructed with a 1. However, if 3 LSBs were un-coded, then the middle reconstruction approach would fill them with 100.

The figure represents an example where Y has high texture and is coded with PCM, while the UV blocks are relatively flat and can be coded with DPCM qn=0 (losslessly coded). The Y sub-block is PCM coded, so there is no bit-budget left, as it uses all the compression bits available. In this example, all the remaining bit-budget available from the UV block is then assigned to the Y block, this illustrates the benefit of bit-sharing between different sub-blocks. There are a total of 50 refinement bits available in this example, and the programming of inventive method allocates these to a block with less bit coverage first (PCM mode), and preferably continues until both blocks have the same bit coverage. Once bit coverage of both blocks is substantially equalized, and if there still remains some portion of the bit budget, then the refinement bits are allocated equally to both blocks.

Figure 6A:
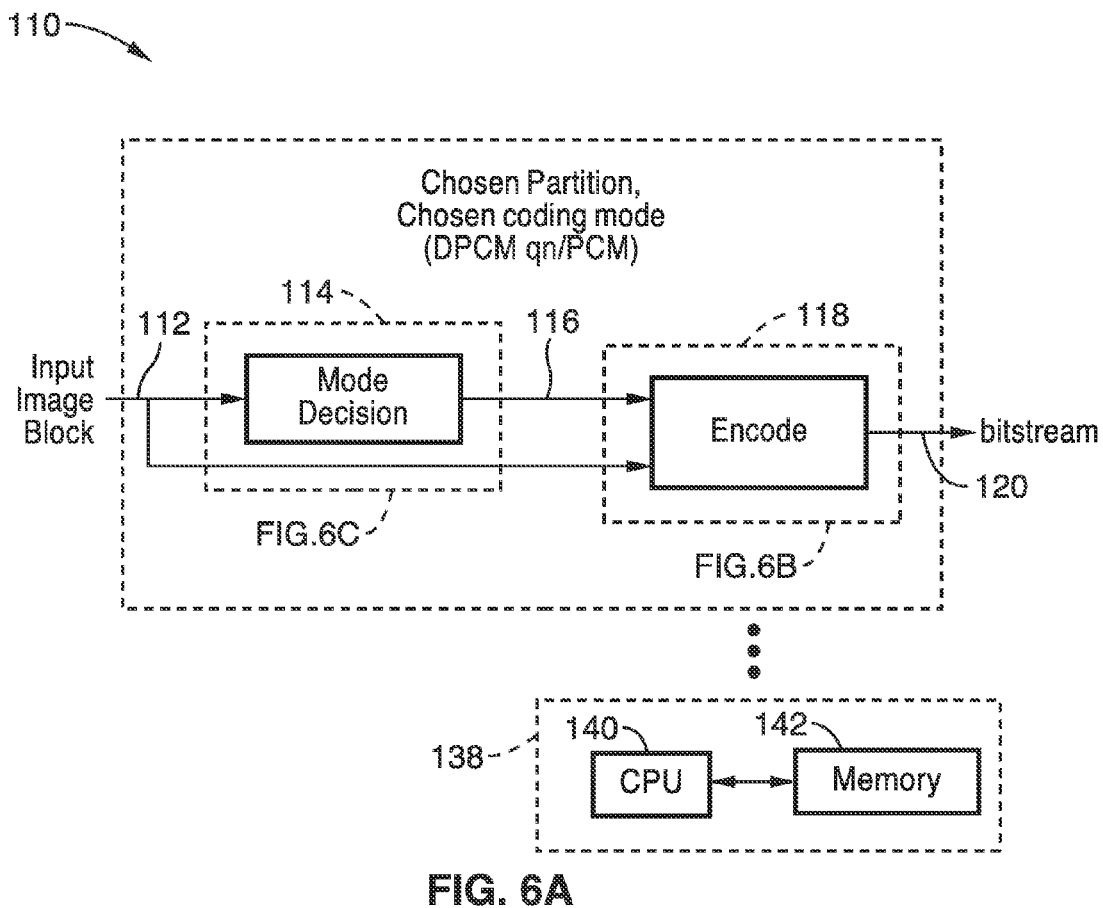
FIG. 6A through FIG. 6C are block diagrams of stages for performing mode decisions and encoding the bits according to an embodiment of the present disclosure.
Figure 6B:
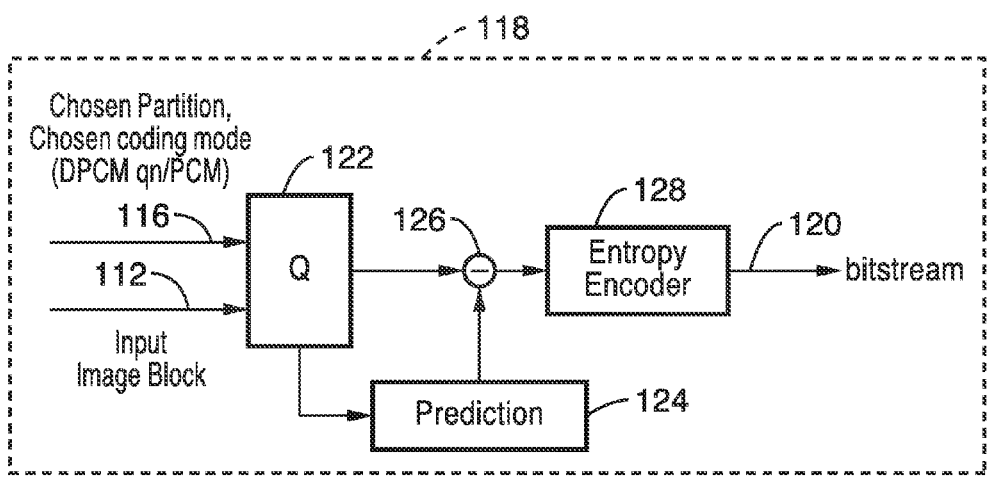
Figure 6C:
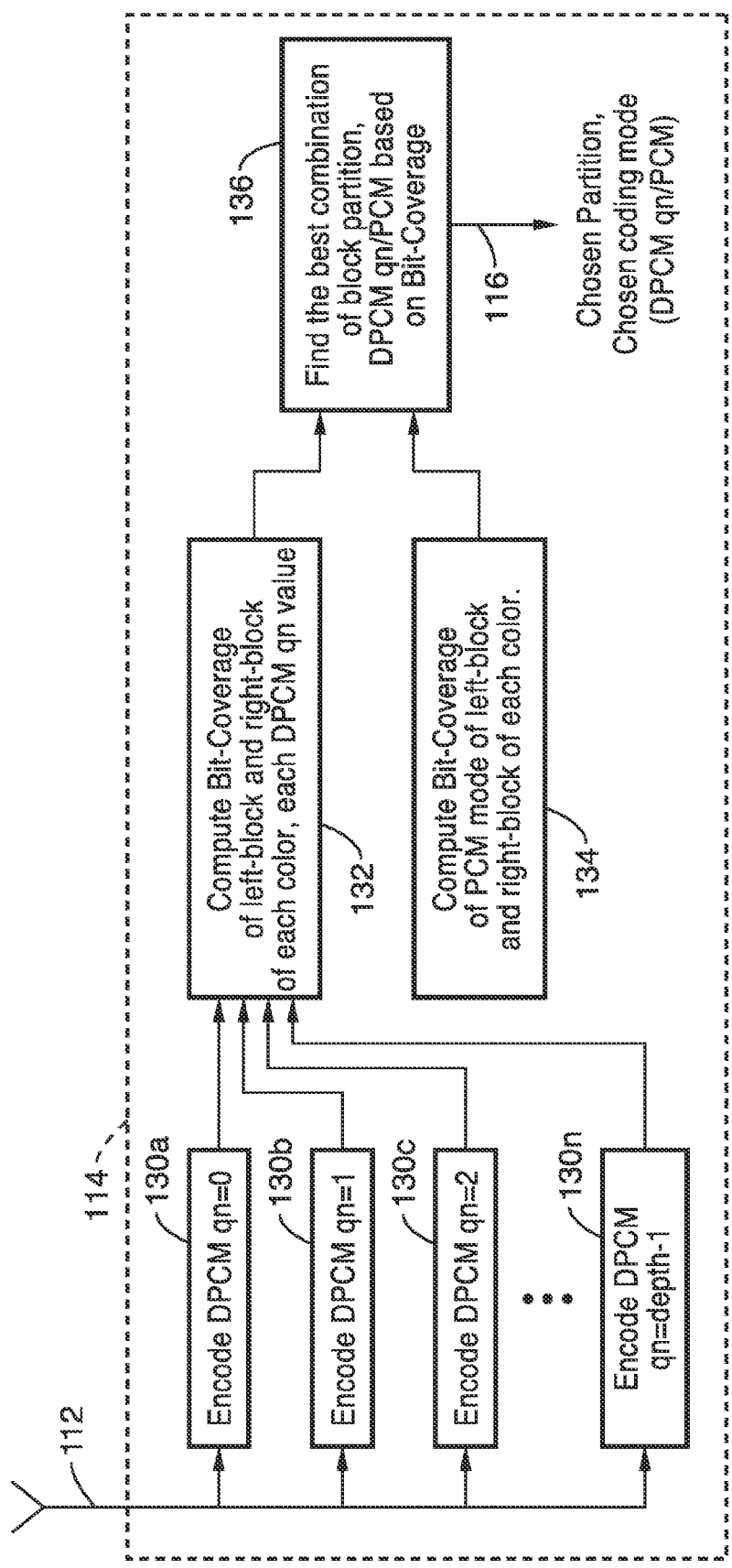

FIG. 6A through FIG. 6C illustrate an example embodiment 110 for making mode decisions during encoding. In FIG. 6A an input image block 112 is received by a mode decision stage 114 whose output 116, along with input image block 112 are input to an encoder 118 for outputting bitstream 120. It will be appreciated that the mode decision determines which partition type to be utilized, such as joint, spatial, color partition and so forth. A decision is made for each partition whether it is coded with DPCM or PCM, and if DPCM is chosen, then a qn value is selected. In FIG. 6B encoder 118 is seen in greater detail with inputs 112, 116 received into a quantization stage 122, coupled to a prediction stage 124, with a difference between quantized 122 and predicted 124 taken at minus sum 126 received at an entropy encoder 128 which outputs bitstream 120.

It should be appreciated that during the mode decision it is first determined what the best qn of DPCM is, and then this is compared with PCM mode, and a selection decision made. It will be recognized that there are many different approaches to finding the mode, without departing from the teachings of the present technology. The principle beneficial elements of the present technology involve programming the EBC to adaptively choose the partition, and that of sharing a bit-budget between partitioned sub-blocks. For some systems (approach 1), prediction 124 is performed first and then quantization 122 is applied at the residual (actually usual image codec); while for other systems (approach 2), quantization 122 is performed first to the input image block and prediction 124 is performed using the quantized value, as seen in FIG. 6B.

It will be noted that prediction 124 can be performed by any desired method. For example during prediction in a 1D block, typically the left sample becomes the predictor of next samples. For a 2D block, there are numerous different known mechanisms to perform prediction.

It will also be noted that the coded residual value is typically entropy coded, wherein one can choose from a vast number of known entropy coding mechanisms without departing from the teachings of the present technology.

In FIG. 6C an example embodiment of the mode decision stage 114 is shown receiving an input image block 112 upon which different DPCM quantization levels (qn=0−n) 130a, 130b, 130c, . . . , 130n are encoded. DPCM outputs at the different quantization levels are received at a bit coverage (e.g., right-left and each color component) computation stage 132, while in parallel a computation is performed 134 determining the bit coverage of PCM mode. Bit coverage outputs for DPCM and PCM are received at a selection stage 136 which determines the best combination of block partition, DPCM at a selected qn or PCM to output a mode decision 116 as was also seen in FIG. 6A.

The above stages are preferably performed in response to programming executing on a processor 138, seen in FIG. 6A, having at least one computer processor 140 (e.g., CPU, microprocessor, microcontroller, DSP, etc.) operating in conjunction with at least one memory 142, within an image coding apparatus. It will be appreciated that programming stored on memory 142, which includes solid state memory and other computer-readable media, is executable on the computer processor 140. The present technology is non-limiting with regard to memory and computer-readable media, insofar as these are non-transitory, and thus not constituting a transitory electronic signal.

In regards to spatial partitioning, it should be appreciated that the left sub-block and right sub-block may have different qn or different mode (DPCM/PCM). Several options exist for coding the right sub-block, for example the first sample of the right sub-block can be DPCM coded using the last pixel of left sub-block as a predictor, or the first sample of the right sub-block can be PCM coded.

The inventive adaptive block partitioning with shared bit budget increases coding efficiency which can be measured (PSNR) and is evidenced by a subjective image quality increase.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations hereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the technology can be embodied in various ways, including but not limited to the following:

1. An embedded block coding (EBC) image coding apparatus, comprising: a computer processor; and programming in a non-transitory computer readable medium and executable on the computer processor for receiving an image and performing steps comprising: performing differential pulse code modulation (DPCM) coding at different prospective quantization levels of a received image block; determining bit-coverage for the image block based on spatial texture or color components for each DPCM quantization level, and for pulse code modulation; performing partitioning of the image block into spatial or color component sub-blocks, and selecting either PCM coding, or DPCM coding at a particular quantization level for each of said sub-blocks; and sharing a bit budget between each of the sub-blocks of a given block, whereby left-over bits are allocated to any of the sub-blocks to optimize coding.

2. The apparatus of any of the previous embodiments, wherein said spatial texture comprises comparing texture differences between different spatial portions of said image block.

3. The apparatus of any of the previous embodiments, wherein said texture differences comprise differences between the right and left portions of said image block.

4. The apparatus of any of the previous embodiments, wherein said image block is a 1D image block.

5. The apparatus of any of the previous embodiments, wherein said image block at each pixel position has a color depth of a given number of bits.

6. The apparatus of any of the previous embodiments, wherein said programming is configured for allocating different bit-budgets to different sub-blocks.

7. The apparatus of any of the previous embodiments, wherein said programming is configured for allocating left-over bits first to sub-blocks with least optimum coding, then if sub-blocks are coded with same quality, then remaining bits are allocated evenly to the sub-blocks.

8. The apparatus of any of the previous embodiments, wherein said programming is configured for performing said partitioning into sub-blocks which are either joint, spatial, or a color partition.

9. The apparatus of any of the previous embodiments, wherein said EBC image compression provides random access capability, with image blocks coded independently of other blocks in the image, and capable of being decoded independently of other blocks.

10. The apparatus of any of the previous embodiments, wherein said EBC apparatus is configured for use with intra-coded digital images.

11. An embedded block coding (EBC) image coding apparatus, comprising: a computer processor; and programming in a non-transitory computer readable medium and executable on the computer processor for receiving an image and performing steps comprising: performing differential pulse code modulation (DPCM) coding at different prospective quantization levels of a received image block which is one dimensional and has a predetermined color depth of a given number of bits at each position; determining bit-coverage for said image block based on spatial texture or color components for each DPCM quantization level, and for pulse code modulation; performing partitioning of said image block into spatial or color component sub-blocks, and selecting either PCM coding, or DPCM coding at a particular quantization level for each of said sub-blocks; and sharing a bit budget between each of the sub-blocks of any given image block by allocating different bit-budgets to different sub-blocks and allocating left-over bits to any desired sub-blocks to optimize coding.

12. The apparatus of any of the previous embodiments, wherein said spatial texture comprises comparing texture differences between different spatial portions of said image block.

13. The apparatus of any of the previous embodiments, wherein said texture differences comprise differences between the right and left portions of said image block.

14. The apparatus of any of the previous embodiments, wherein said programming is configured for allocating left-over bits first to sub-blocks with least optimum coding, then if sub-blocks are coded with same quality, then remaining bits are allocated evenly to the sub-blocks.

15. The apparatus of any of the previous embodiments, wherein said programming is configured for performing said partitioning into sub-blocks which are either joint, spatial, or a color partition.

16. The apparatus of any of the previous embodiments, wherein said EBC image compression provides random access capability, with the image blocks coded independently of other blocks in the image, and capable of being decoded independently of other blocks.

17. The apparatus of any of the previous embodiments, wherein said EBC apparatus is configured for use with intra-coded digital images.

18. A method of embedded block coding (EBC), comprising: receiving an image in an image coding apparatus; performing differential pulse code modulation (DPCM) coding at different prospective quantization levels of a received image block; determining bit-coverage for the image block based on spatial texture or color components for each DPCM quantization level, and for pulse code modulation; performing partitioning of the image block into spatial or color component sub-blocks, and selecting either PCM coding, or DPCM coding at a particular quantization level for each of said sub-blocks; and sharing a bit budget between each of the sub-blocks of a given block by allocating different bit-budgets to different sub-blocks, and allocating left-over bits to any of the sub-blocks to optimize coding.

19. The method of any of the previous embodiments, wherein said spatial texture comprises comparing texture differences between right and left portions of a 1D image block.

20. The method of any of the previous embodiments, wherein said EBC apparatus is configured for use with intra-coded digital images.

Although the description above contains many details, these should not be construed as limiting the scope of the technology but as merely providing illustrations of some of the presently preferred embodiments of this technology. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An embedded block coding (EBC) image coding apparatus, comprising:
   (a) a computer processor; and
   (b) programming in a non-transitory computer readable medium and executable on the computer processor for receiving an image and performing steps comprising:
      (i) performing differential pulse code modulation (DPCM) coding at different prospective quantization levels of a received image block;
      (ii) determining bit-coverage for the image block based on spatial texture or color components for each DPCM quantization level, and for pulse code modulation;
      (iii) performing partitioning of the image block into spatial or color component sub-blocks, and selecting either PCM coding, or DPCM coding at a particular quantization level for each of said sub-blocks; and
      (iv) sharing a bit budget between each of the sub-blocks of a given block, whereby left-over bits are allocated to any of the sub-blocks to optimize coding.

2. The apparatus recited in claim 1, wherein said spatial texture comprises comparing texture differences between different spatial portions of said image block.

3. The apparatus recited in claim 2, wherein said texture differences comprise differences between the right and left portions of said image block.

4. The apparatus recited in claim 1, wherein said image block is a 1D image block.

5. The apparatus recited in claim 4, wherein said image block at each pixel position has a color depth of a given number of bits.

6. The apparatus recited in claim 1, wherein said programming is configured for allocating different bit-budgets to different sub-blocks.

7. The apparatus recited in claim 1, wherein said programming is configured for allocating left-over bits first to sub-blocks with least optimum coding, then if sub-blocks are coded with same quality, then remaining bits are allocated evenly to the sub-blocks.

8. The apparatus recited in claim 1, wherein said programming is configured for performing said partitioning into sub-blocks which are either joint, spatial, or a color partition.

9. The apparatus recited in claim 1, wherein said EBC image compression provides random access capability, with image blocks coded independently of other blocks in the image, and capable of being decoded independently of other blocks.

10. The apparatus recited in claim 1, wherein said EBC apparatus is configured for use with intra-coded digital images.

11. An embedded block coding (EBC) image coding apparatus, comprising:
    (a) a computer processor; and
    (b) programming in a non-transitory computer readable medium and executable on the computer processor for receiving an image and performing steps comprising:
       (i) performing differential pulse code modulation (DPCM) coding at different prospective quantization levels of a received image block which is one dimensional and has a predetermined color depth of a given number of bits at each position;
       (ii) determining bit-coverage for said image block based on spatial texture or color components for each DPCM quantization level, and for pulse code modulation;

(iii) performing partitioning of said image block into spatial or color component sub-blocks, and selecting either PCM coding, or DPCM coding at a particular quantization level for each of said sub-blocks; and (iv) sharing a bit budget between each of the sub-blocks of any given image block by allocating different bit-budgets to different sub-blocks and allocating left-over bits to any desired sub-blocks to optimize coding.

12. The apparatus recited in claim 11, wherein said spatial texture comprises comparing texture differences between different spatial portions of said image block.

13. The apparatus recited in claim 12, wherein said texture differences comprise differences between the right and left portions of said image block.

14. The apparatus recited in claim 11, wherein said programming is configured for allocating left-over bits first to sub-blocks with least optimum coding, then if sub-blocks are coded with same quality, then remaining bits are allocated evenly to the sub-blocks.

15. The apparatus recited in claim 11, wherein said programming is configured for performing said partitioning into sub-blocks which are either joint, spatial, or a color partition.

16. The apparatus recited in claim 11, wherein said EBC image compression provides random access capability, with the image blocks coded independently of other blocks in the image, and capable of being decoded independently of other blocks.

17. The apparatus recited in claim 11, wherein said EBC apparatus is configured for use with intra-coded digital images.

18. A method of embedded block coding (EBC), comprising:

(a) receiving an image in an image coding apparatus;

(b) performing differential pulse code modulation (DPCM) coding of a received image block at different prospective quantization levels;

(c) determining bit-coverage for the image block based on spatial texture or color components for each DPCM quantization level, and for pulse code modulation;

(d) performing partitioning of the image block into spatial or color component sub-blocks, and selecting either PCM coding, or DPCM coding at a particular quantization level for each of said sub-blocks; and (e) sharing a bit budget between each of the sub-blocks of a given block by allocating different bit-budgets to different sub-blocks, and allocating left-over bits to any of the sub-blocks to optimize coding.

19. The method recited in claim 18, wherein said spatial texture comprises comparing texture differences between right and left portions of a 1D image block.

20. The method recited in claim 18, wherein said EBC apparatus is configured for use with intra-coded digital images.

* * * * *